United States Patent [19]
Curry

[11] Patent Number: 6,055,552
[45] Date of Patent: Apr. 25, 2000

[54] DATA RECORDING APPARATUS FEATURING SPATIAL COORDINATE DATA MERGED WITH SEQUENTIALLY SIGNIFICANT COMMAND DATA

[75] Inventor: Bo U. Curry, Redwood City, Calif.

[73] Assignee: Hewlett Packard Company, Palo Alto, Calif.

[21] Appl. No.: 08/961,691

[22] Filed: Oct. 31, 1997

[51] Int. Cl.$^7$ ..................................... G06F 17/30
[52] U.S. Cl. ...................... 707/530; 178/18.01; 345/507; 345/179
[58] Field of Search .................. 707/530; 178/18.01; 345/507, 179

[56] References Cited

U.S. PATENT DOCUMENTS

| | | | |
|---|---|---|---|
| 5,564,005 | 10/1996 | Weber et al. | 345/326 |
| 5,629,499 | 5/1997 | Flickinger et al. | 178/18.01 |
| 5,661,506 | 8/1997 | Lazzouni et al. | 345/179 |

Primary Examiner—Thomas G. Black
Assistant Examiner—William Trinh
Attorney, Agent, or Firm—Marc P. Schuyler

[57] ABSTRACT

This disclosure provides a data recording system and, in particular, an electronic digitizing clipboard and a remote computer. A stylus of the clipboard is used to write on pages, with a digitizer underneath the pages generating an electronic record of entered marks for storage and later recreation of the pages. The electronic record represents both stylus spatial coordinates, normally sampled every ten milliseconds, certain user commands such as page identification, inserted at significant locations within the aggregate data stream, or other data, for example, audio data from a built-in microphone. Data in the stream is associated with prior page identification commands, such that subsequent data may be cut or sorted based upon timing of that data relative to the page identification commands. In this manner, data may be distinguished and moved by a "splicing" mechanism, notwithstanding any spatial overlap with previous stylus data.

22 Claims, 6 Drawing Sheets

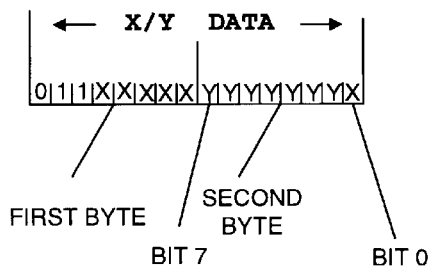
FIG. 8
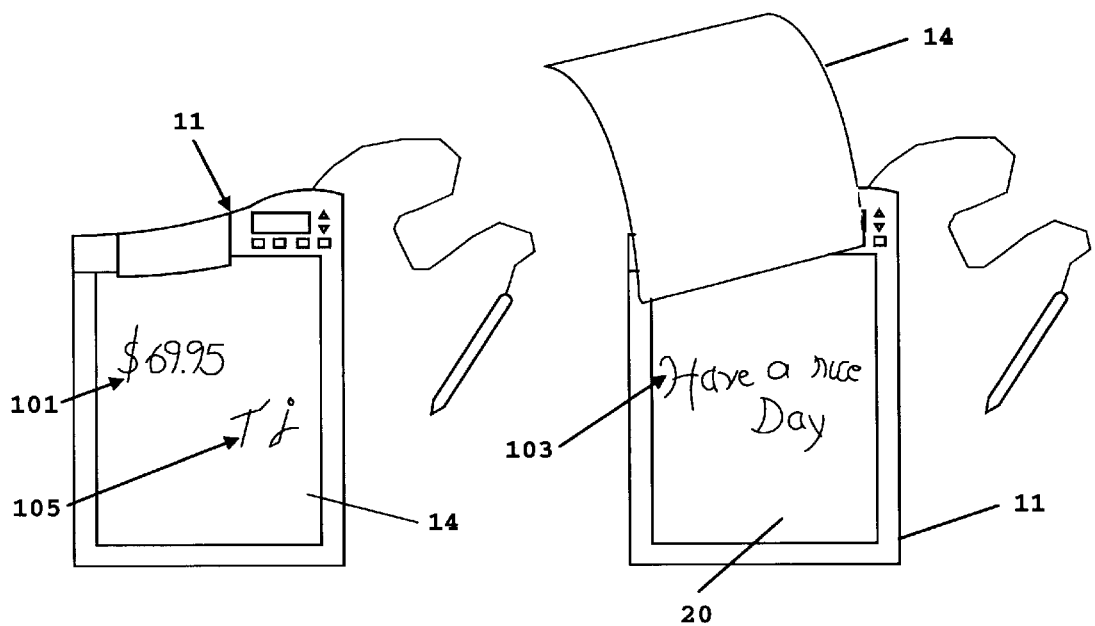
FIG. 9    FIG. 10
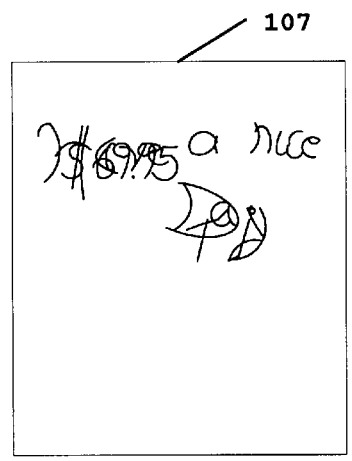
FIG. 11

DATA RECORDING APPARATUS FEATURING SPATIAL COORDINATE DATA MERGED WITH SEQUENTIALLY SIGNIFICANT COMMAND DATA

The present invention relates to a data recording apparatus for entering information onto plural pages. In particular, it provides a device that efficiently processes a sequence of data in a manner such that data representing spatial coordinates can later be filtered and assigned to one of the pages based upon relative time of entry.

BACKGROUND

Electronic data capture devices have recently gained popularity as an effective way to electronically store and index data. For example, delivery services, retail stores, manufacturers and others commonly use such electronic devices to partially or completely replace conventional paper forms, such that electronic files may instead be used to save space associated with records retention. To cite another example, many retail stores now use signature capture devices to process credit card transactions; a customer signs his or her name upon a paperless electronic capture device, in lieu of using any carbon form. A hardcopy receipt bearing a reproduced signature and purchase record is then printed for the customer, while the retail store retains only an electronic record of the transaction.

Most such electronic capture devices are designed to be relatively foolproof, e.g, such that entered data is automatically applied to the correct document, and little possibility exists for transposing signatures or data to the wrong form. In the case of capture devices controlled as one element of a multiple step process (e.g., credit card processing), error is typically controlled by processing only one transaction at a time and accepting a customer signature only at a specific time in the process. Similarly, in the case of portable devices such as used in inventory tracking and similar applications, capture devices are frequently designed to be used with only one form at a time.

While generally useful for their intended purposes, these electronic devices (and many others intended to electronically replace conventional forms processing practices) generally suffer from being somewhat rigid, for example, in only being able to process one transaction or form at a time, and in not permitting a user to edit entered data. Further, devices required to internally store electronic data (e.g., portable devices) must typically contain substantial internal memory, making such devices costly and heavy. In many conventional paper processing applications, it is generally desired to afford a user with the ability to move around and concurrently handle multiple forms, as one might do while completing hardcopy forms, and capture devices which are heavy or rely on a tethered connection to a computer are not fully compatible with this desired end. Therefore, there has traditionally been a need for lightweight, portable, flexible devices that enables a user to process multiple forms.

Recently, U.S. Pat. No. 5,629,499 (the "'499 Patent") has provided a partial solution to the problem of concurrent processing of multiple pages or forms, via that patent's disclosure of a multiple page, portable, digitizing clipboard. Using the clipboard, a user can actually write upon multiple, stacked pages, with a digitizer beneath the pages capturing pen stroke information; a user interface is utilized to switch a displayed indication of a current page between the multiple pages, and captured electronic data is thereby associated with the selected page. Thus, a user can simultaneously complete several hardcopy pages, all stacked upon the clipboard, and simultaneously and automatically also create electronic information corresponding to pen strokes for archiving or recreating of each hardcopy page.

Unfortunately, the device shown by the '499 Patent has limited internal memory, and its principal embodiments require a user to correctly and timely switch definition of a current page in order that electronic information is associated with the proper page. Failure to properly switch page definition could potentially result in information being associated with the wrong page; if the user did not properly switch page definition, then data intended for different pages might be incorrectly associated with a single page, in a spatially overlapping manner. The '499 Patent also does not teach any way of editing entered data.

A definite need exists for a data capture system that has concurrent processing capability and which also effectively manipulates data to efficiently store that data, whether or not the system is configured in a standalone mode. Ideally, such a system should provide a mechanism for significantly reducing the impact of errors caused by data transposed between multiple forms, for example, by generating data representing spatial coordinates which can later be edited or filtered and assigned to the correct page. A definite need also exists for a system that provides for ready editing of entered electronic data. The present invention solves these needs and provides further related advantages.

SUMMARY OF THE INVENTION

The present invention solves the aforementioned needs by providing a data recording apparatus that efficiently processes a sequence of data in a manner such that data representing spatial coordinates can later be filtered and assigned to one of multiple pages based upon relative time of entry. As a result, the present invention provides a data entry device that can be used to portably carry and concurrently process multiple forms, and to automatically generate electronic records of hardcopy pages or forms. The data entry device also generates data in a manner suitable for easy editing, notwithstanding any spatial overlap of data, for example, as might be caused by failure of a user to differentiate files or pages. Used with image compression, the present invention provides a device which is portable, and flexibly permits a user to process a large number of forms without the requirement of a tether, and with less required internal memory. As should therefore be apparent, the present invention provides a flexible electronic data capture device suitable for many applications.

The invention provides a data entry apparatus for creating plural pages of data in a format adapted for editing by a remote editor. In particular, the apparatus includes an input device, such as a stylus, selectively operated by a user to enter position-sensitive data. The apparatus also includes a command mechanism that marks changes between different pages, e.g., to indicate that a user is writing upon a first page, or a second page, or once again on a first page. The apparatus automatically inserts command codes into the position-sensitive data to form a data stream which both represents user commands and position-sensitive data. Using this configuration, a remote editor can reproduce each page based on the relative timing of the command codes within the data stream, and can move data, such as individual pen strokes, between pages notwithstanding any spatial overlap between them.

As one example, if the remote editor receives as a sequence a code identifying a first page, then the remote editor can associate all immediately subsequent data with the first page. If a stylus is used as the input device, then data will likely be in the form of "pen strokes," and the editor associates all pen strokes with the first page, until an identification code is received identifying a second page, and subsequent pen strokes are then associated with the second page.

In more particular aspects of the invention, the apparatus can include a time code generator, and can sample data from the input device at regular intervals, e.g., each ten milliseconds. Time codes can be inserted with each sampling of data, or simply to correspond to the beginning of each stylus stroke. Data compression can be used to efficiently store data in internal memory to the apparatus, facilitating the ability of a small, lightweight apparatus to portably store data from many pages. Also, a single data format can be used for many different types of information, for example, for command codes, stylus data, barcode data from a barcode scanner, audio data from a microphone, or other types of data as well.

As can be seen from the foregoing, a data entry apparatus having the above features enables a user to complete hardcopy forms (e.g., preprinted pages or blank pages) while simultaneously generating an electronic record of all entered data. By efficiently processing data in the manner just indicated, the apparatus provides the ability to concurrently process many pages of data, and to correct errors caused by writing on the wrong page or which result in data being electronically transposed to the wrong file or page. As can be seen therefore, a preferred device embodying features mentioned just above should find wide application in any forms processing application, e.g., inventory tracking, as well as many other applications.

The invention may be better understood by referring to the following detailed description, which should be read in conjunction with the accompanying drawings. The detailed description of particular preferred embodiments, set out below to enable one to build and use particular implementations of the invention, is not intended to limit the enumerated claims, but to serve as particular examples thereof.

BRIEF DESCRIPTION OF THE DRAWINGS

FIGS. 4–8 illustrate the preferred data compression scheme used by the clipboard of FIG. 1, with FIGS. 4–8 each representing one data packet consisting of either one command code or a set of spatial coordinates of the stylus' tip; as seen in FIGS. 4–8, the data compression scheme used by the clipboard results in each data packet occupying two to six bytes.

FIG. 4 is a diagram used to illustrate the format of one packet of uncompressed data {x,y,p}, with two bytes of "x" data, two bytes of "y" data, and two bytes of "type" of data represented by the packet; the three first bits of the first byte indicate that full value "x" data, "y" data and "type" data are present in the packet.

FIG. 5 shows a data packet similar to that of FIG. 4, but without any "type" data, as indicated by a logical "zero" in the high-order bit of the first byte. When the data packet represents stylus data, as opposed to a code, non-inclusion of the "type" data field indicates that there has been no change in data type.

FIG. 6 shows a data packet similar to that seen in FIG. 5, but in which "x" data is compressed to one byte, such that the packet includes one byte of "x" data, and two bytes of "y" data. Compression of "x" data to one byte is indicated by a logical "one" in the second highest order bit of the first byte. The compressed "x" data represents a six bit signed offset from the "x" value of the previous data point.

FIG. 7 shows a data packet similar to that seen in FIGS. 4–6, but in which "y" data is compressed to one byte, such that the packet includes two bytes of "x" data, followed by one byte of "y" data. Compression of "y" data to one byte is indicated by a logical "one" in the third highest order bit of the first byte. The compressed "y" data represents a seven bit signed offset from the "y" value of the previous data point.

FIG. 8 shows a data packet similar to that seen in FIGS. 4–7, but in which each of the "x" data and the "y" data are compressed to one byte (indicated by logical "ones" in the second and third bits of the first byte, respectively), and in which no "type" data is present (indicated by a logical "zero" in the first bit of the first byte).

FIGS. 9–17 are used to indicate processing of data by a remote computer to separate spatially overlapping data (in electronic form) to correspond to two separate hardcopy pages based upon relative time of data entry. FIGS. 9–10 each show writings entered using the clipboard of FIG. 1 where it is presumed that a user forgot to electronically indicate a page change using a user interface of the clipboard; in FIGS. 9–10, the user has first entered a money amount upon a top page (FIG. 9), then switched to a bottom page (FIG. 10) to enter the text "have a nice day," and lastly, switched back to the top page (FIG. 9) to enter two initials. FIGS. 11–17 represent a "splicing" program used by a remote computer, to separate the spatially overlapping data and form two separate pages from that data.

FIG. 9 represents aggregate writings upon a top page mounted by the clipboard, respectively, an amount and two initials.

FIG. 10 represents aggregate writings upon a bottom page mounted by the clipboard, namely, the text "have a nice day" (entered after the writing of amount on the top page indicated by FIG. 9, but before entry of the two initials upon the top page indicated by FIG. 9).

FIG. 11 represents an image formed from electronic data representing both pages of FIGS. 9 and 10, where there has been no intervening command to identify the transitions from the top page to the bottom page, and back again; the captured electronic data consequently indicates spatially-overlapping data all on a single page.

FIG. 12 shows a screen of a "splicing" program run upon a remote personal computer; a status bar at the top of the FIG. 12 indicates that time is "early" in the writing process represented by FIGS. 9 and 10, e.g., corresponding to a time prior to entry of any writings on either the top or bottom pages. FIG. 12 also indicates the presence of "fast rewind," "play backward," "play forward," "fast forward," "pause," "mark" and "cut" buttons, which are displayed at the bottom of the screen.

FIG. 13 is a representation similar to FIG. 12, but in which the "play button" has been pressed and some time has passed, as indicated by the status bar at the top of FIG. 13; the sequence of data entered using the clipboard has been "played forward" to correspond to the time just after entry of the written amount ($69.95, seen in FIG. 9).

FIG. 14 is a representation similar to FIG. 13, but in which more time has passed, corresponding to the writing of both of the amount ($69.95) upon the top form (FIG. 9) and a part of the text "Have a nice day" upon the bottom form (FIG. 10), without the user having input a page identification command through the clipboard's user interface.

FIG. 15 is a representation similar to FIG. 14, but in which the "play backward" and "mark" buttons of the computer screen have now been selected, to scroll writings with respect to time backward prior to commencement of writing "Have a nice day" while simultaneously marking that phrase for edit.

FIG. 16 is a representation similar to FIG. 15, but in which the "cut button" is now seen as highlighted, corresponding to the opening of a new, "cut-text window," to display "cut" writings.

FIG. 17 is a representation similar to FIG. 16, but in which the "cut button" has been deselected after time corresponding to entry of the text "Have a nice day," such that the subsequent initials ("tj," entered later in time) will be placed into the first window together with the monetary amount ($69.95), to correspond to the hardcopy, top form (FIG. 9); the text which has been cut is now illustrated in a second window, corresponding to a different page.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a data entry system, namely, a digital electronic clipboard and a remote computer and splicing software. The invention, however, may also be applied to other types of systems as well.

I. INTRODUCTION TO THE PRINCIPAL PARTS

The present invention is embodied in a digital electronic clipboard 11 having special applications to page and form processing systems. U.S. Pat. No. 5,629,499 (the "'499 patent") sets forth background relating to a clipboard design utilized in the preferred embodiment, and is hereby incorporated in reference in its entirety, as though reproduced herein.

Figure 1:
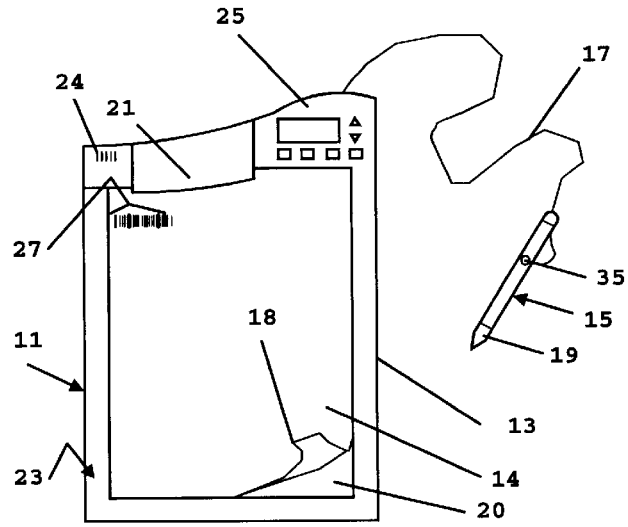
FIG. 1 shows a digital electronic clipboard including both a digitizer section and a stylus, which has an inking tip at one end; the clipboard is seen as mounting two stacked pages (one of which, the top page, has a corner upturned).

With reference to FIG. 1, a digital electronic clipboard 11 is illustrated as including a digitizer section 13, which supports a top page 14 (e.g., blank paper or a preprinted document having data entry fields), a stylus 15 for writing on pages and generating electronic stylus data, and a tether 17, which physically and electronically connects the stylus to the clipboard. In the context of the present invention, it is desired to provide a user with the ability to concurrently process multiple forms, and to this effect, a corner 18 of the top page is seen as "lifted" to reveal the presence of a second, bottom page 20, beneath the top page. The clipboard may be utilized for writing upon each page 14 or 20, and switching between them as desired, to both complete entry of data on paper forms and simultaneously generate electronic records of all information written upon each page.

The clipboard 11 further includes a clip mechanism 21, for pinning the pages 14 and 20 to a paper supporting surface 23, and for permitting ready addition of a large number of additional pages, all in stacked relationship; FIG. 1 also indicates use of a built-in microphone 24 which may be optionally used to input audio data linked to specific forms or specific fields appearing on preprinted forms. The stylus has a writing tip 19 (such that the user marks the pages, e.g., by ink, pencil or otherwise), a pressure sensing mechanism, and position sensing electronics which generate signals representing location of the writing tip 19 with respect to the digitizer section 13. The stylus 15 may further include a light emitting diode ("LED") 35, which is illuminated when the writing tip 19 is pressed against a page (e.g., when the stylus is being used to "write" upon the page).

While the user may enter data on hardcopy pages in any order desired, the clipboard 11 is preferably "informed" when the user ceases writing on one page 14 or 20 and begins writing upon the other page 20 or 14. To this effect, a number of mechanisms may be implemented to electronically mark a page change in the electronic records. For example, the preferred clipboard 11 includes a user interface 25, which has an electronic display and buttons for displaying and selecting specific user commands from a predefined menu, such as for notifying the clipboard which page the user is writing on. The system may also include a bar code scanner (not shown in FIG. 1) for scanning a bar code 27 mounted upon each page each time the user newly writes on the page having the bar code. The bar code, in this implementation, would contain information about form "type," e.g., "invoice," as well as a unique serial code (form "instance") which distinguishes a completed hardcopy "invoice" from other "invoices." It should be recognized that the clipboard 11 need not be used only with pages having preprinted information (e.g., "invoice") and that blank pages may be used as well and identified by a bar code or identifier in precisely the same manner. Details of a bar code scanner suitable for use with the clipboard 11 may be obtained in reference to copending application no. for a "Handheld Writing Device and Related Data Entry System," filed on the same date as this disclosure, by inventors Robert Leichner, Bo Curry and Dan Flickinger, which is hereby incorporated by reference in its entirety, as though set forth herein.

In the context of the present invention, page change commands and data from the stylus and digitizer are integrated into a single, sequenced data stream, which represents both user commands and stylus data. The stylus 15 is sampled by clipboard electronics each ten milliseconds, to produce a continuous stream of stylus position data, representing "x" and "y" spatial coordinates with respect to the clipboard, as well as pressure upon a writing tip of the stylus. This pressure indication in the preferred embodiment includes a one-bit tip-down signal, indicating whether the writing tip is depressed against a page (e.g., the stylus is being used to "write"), but could also be made to occupy more bits to represent relative pressure, or "darkness" of each pen stroke upon the page.

While a user of the clipboard 11 may be presented with several options for selecting page change commands (e.g., via the bar code scanning option, discussed above), the user interface 25 preferably may always be used to select commands. This selection is performed by using scroll buttons, to scroll through multiple possible menu commands which are displayed for the user. An "enter" button is then utilized, while a selected command is displayed, to trigger insertion of a desired command into the data stream, as has just been described, or to cause immediate execution of the command.

In connection with the "type" data, user commands from the user interface as well as certain other commands are inserted sequentially into the stream of stylus data as escape characters; that is to say, the commands are inserted as soon as possible into the data stream, e.g., immediately, if no stylus data is being concurrently processed, or immediately after a sample of stylus data which is concurrently being processed. A resulting aggregate data stream, including certain commands which have been merged with stylus data, is sequentially stored in memory internal to the clipboard 11, for later upload to a remote editor (preferably, a remote computer running suitable data editing and clipboard interface software). If the inserted command is an identification of a particular form (e.g., the bottom form 20), the position of that command within the aggregate data stream is temporally significant and all electronic data following that identification in the memory can be associated with the bottom form, until another electronic identifier indicates a change to another page.

The electronic identifier (for the page change) which is inserted in the data stream should preferably specifically identify the type of form utilized, such that any preprinted information can be electronically merged with entered stylus data once the information has been transferred to the remote computer. For example, if a user of the clipboard 11 is completing an "invoice", the electronic data generated by the clipboard preferably includes a code that enables a program running on the remote computer (not seen in FIG. 1) to electronically associate an image of a blank invoice with the electronic data; that is to say, the clipboard generates data which can later be combined with an electronic image of a form. In addition, use of a code representing both form "type" and "instance" permits the remote computer to automatically merge entered data with previously entered data for the same page or form; a user can start filling out a form during one clipboard session, upload data to the remote computer, and then complete the same page or form during a second session, and the software of the remote computer can associate the data with the same page or form. Specific codes for each page or form are not the only mechanism for tracking forms, and the clipboard can also use an index which merely identifies active pages upon the clipboard, e.g., pages 1–132. In the preferred embodiment, both the index and specific codes are used by the clipboard and remote computer to track and process pages and forms. As used herein, the term "form" includes both preprinted and blank forms which may have one or more "pages."

The preferred clipboard embodiment generates and organizes entered data in such a manner that it can easily be edited after generation, even if a user forgets to mark, or improperly marks, a page change. In this context, it is desired in many applications to have a flexible system usable in creating and marking many different pages. The preferred clipboard meets this need by generating a single data stream, representing all data entered using the stylus 15, and certain commands entered by the user, sequentially arranged within the stream for easy later sorting or editing of stylus data. Via software on the remote computer, stylus data can then be displayed in an image window dedicated to each form. The software permits storage of the displayed data only, or merging of the displayed data with image information representing the "type" of form (e.g., an image of a blank "invoice") for recreation of the form. Importantly, as further described below, the remote computer preferably also runs "splicing" software which permits processing of stylus data based upon relative time of entry, such that stylus data can be distinguished, cut and reassigned between multiple pages, notwithstanding any spatial overlap with other (correctly assigned) stylus data.

Prior to further explanation of the functional configuration of the preferred clipboard, it will be helpful to explain the nature of some commands used in the preferred embodiment, as well as preferred forms hierarchy for varied applications of the clipboard. Use of a forms hierarchy, such as that described below, permits ready adaptation of the clipboard to certain commercial uses where defined, preprinted forms are commonly used.

A. Commands

Commands can be generated automatically by the clipboard, by the user (through the user interface) or by the remote computer. One example of a command automatically generated and inserted directly into the data stream by the clipboard is a time stamp, which can be inserted into the data stream with each new stylus "stroke" (e.g., each time "pressure" on the writing tip indicates new contact between the stylus and a page); a time stamp could also be generated by a clipboard central processing unit ("CPU") with each sampling of stylus data, and formed as part of the original stream of stylus data sampled and formatted by the CPU. Examples of a command generated by the user would include most anything input using an "enter" button of the user interface, such as selection of a new page for writing, creation of a new form "instance," deletion of a page from the clipboard's active memory, or upload of data from the clipboard's serial memory to the remote computer. A command from the user might also take the form of a scanned bar code of the form, or of a package, if a bar code scanner is connected to the clipboard. Finally, commands from the remote computer might include a request for retransmission of data, download of additional forms definitions to the clipboard, or an download of software to be run on the clipboard's CPU. Communication between the remote computer and the clipboard can occur via any mechanism, such as infrared communications but, preferably, the clipboard primarily relies upon a serial communications interface (i.e., an RS-232 or similar standard computer interface) for communication with the remote computer.

In the context of the present invention, commands identifying that the user desires to write on or create a specific page are directly inserted into the stylus' data stream, at a significant location. Preferably, a number of pre-existing forms are known to the clipboard, and new forms can be created, all as defined by a forms hierarchy (such as described below in reference to FIG. 2). Switching between known forms can be effected using the CPU's active forms list, by using the user interface 25 to select one of multiple pages on the clipboard and by selecting that page by pressing an "enter" key when the appropriate selection is displayed. If a bar code scanner is used to scan a bar code representing a page, the CPU is instructed by firmware to first search the active forms list, to determine whether a scanned bar code corresponds to an active form and, if not, the CPU then automatically creates a new form (adding pages and form type definition to the active forms list). If the user is manually utilizing the user interface 25 to signify addition of a new page to the clipboard, the user selects a "create form" menu option, and form type, instance and page menu options, as exemplified below in connection with a discussion of FIG. 2. Commands from the user interface 25 selecting or creating pages are executed (and inserted into the stylus' data stream) at the time that the user presses the "enter" key.

Specific commands selected by the user are not the only type of commands which are inserted into the data stream;

as an example, each time the stylus is newly depressed against a page, a time code is automatically inserted into the data stream, indicating both date and time of day.

B. Definitions of Form Type and Instance

Figure 2:
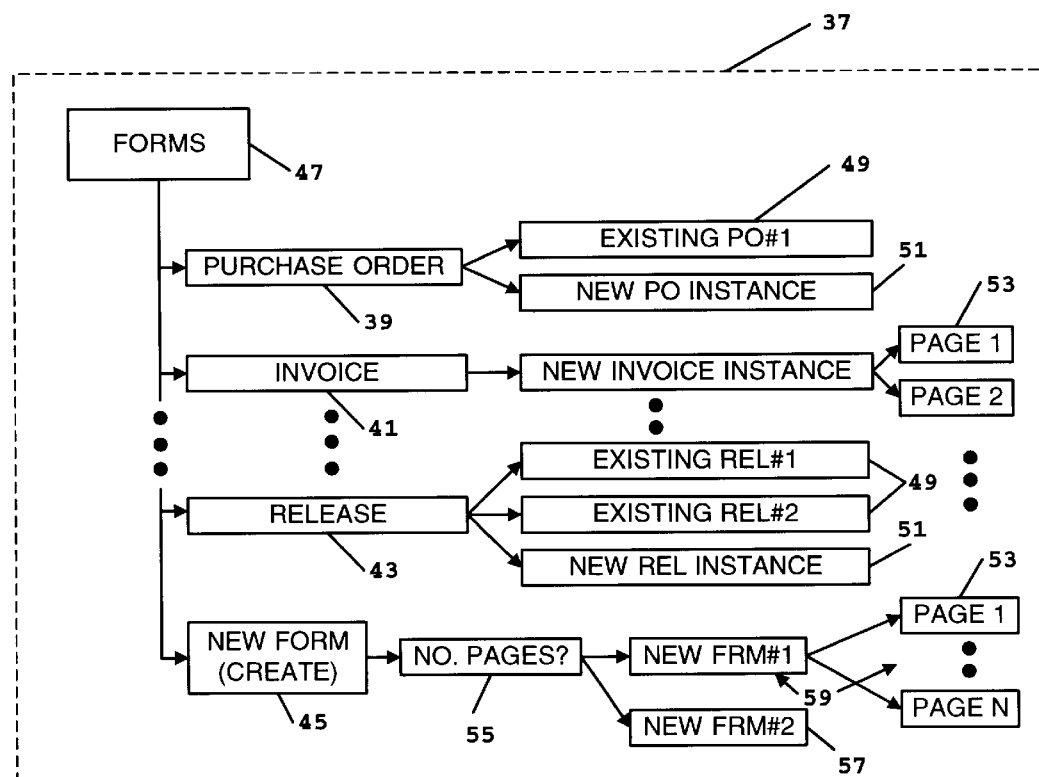
FIG. 2 is a diagram showing a logical hierarchy of forms organization of the clipboard of FIG. 1.

FIG. 2 illustrates a hierarchy 37 of hypothetical forms stored in firmware or software, a hierarchy which can be tailored to a specific application. For example, FIG. 2 illustrates commonly used business forms, including, "purchase order" 39, "invoice" 41, "release" 43 and "new form" 45 (i.e., blank or unknown pages). The listed hierarchy would be used to either define a new form or activate an old form and cause the CPU to add the form to its list of active forms.

In using the user interface 25 to access the stored hierarchy of predefined form types, a user would scroll through root menu commands such that the word "forms" 47 is displayed by a Liquid Crystal Display ("LCD") of the user interface, and would push an "enter" button. The user would then scroll through predefined forms "purchase order" 39, "invoice" 41, "release" 43 and "new form" 45, and would push the "enter" button again to select whichever selection is displayed upon the LCD. Having thus selected general form "type," the user preferably then begins another menu selection process, where the user can select either an existing "instance" 49 (e.g., a previously commenced form already having data) or a new instance 51 (uncommenced, blank form). Upon selecting a new instance, a new instance number is assigned to the new form (e.g., existing release number two), etcetera. If the form is a type which includes multiple pages, the user is presented with another menu that permits the user to select a particular one of the multiple pages, and so on, as indicated by the reference numeral 53 in FIG. 2. As further indicated by reference numeral 55 of FIG. 2, a user can define a new form (e.g., a blank page or previously undefined form type) consisting of either a single page or multiple pages, as designated by reference numerals 57 and 59, respectively.

Data entered onto forms are not electronically displayed to the user, nor is stylus data from a previously commenced form instance necessarily stored in the clipboard's internal memory. Rather, each time a page is newly created or activated, an index is created in a memory space reserved by the clipboard's CPU for use in processing various commands. Completed form instances preferably are deleted from memory once a form or page is completed and uploaded to the remote computer (e.g., either via a command automatically sent from the remote computer, or via selective use of the user interface).

For example, when a user initially begins a new form instance, data entered for the new form instance will be stored in the clipboard's internal memory (together with command codes). A page identification code will also be generated and stored in the CPU's reserved memory space and in the data stream. Subsequently, the user can optionally upload the contents of the sequential memory corresponding to the page or form to a remote computer, and erase the corresponding data, such that the clipboard no longer has memory of entered data; the clipboard does, however, selectively retain memory of the form identification code of the specific form instance which has been created. As a consequence, the user can subsequently recall the form instance to add additional data, which is then stored in the clipboard's memory. The clipboard does not display entered data, but simply identifies it to the remote computer as corresponding to the specific form instance. When the contents of the sequential memory are again uploaded to the remote computer, the page identification codes inserted into the sequential memory are used by the remote computer to combine the original uploaded data with the new uploaded data. Importantly, each stylus stroke will have at least one associated time of entry, and so, different stylus strokes are distinguished by time of entry and can be separated by the remote computer and be reassigned to different forms, notwithstanding any spatial overlap.

II. PREFERRED HARDWARE FUNCTIONAL CONFIGURATION

Physical and electronic configuration of the preferred device will now be additionally explained with reference to FIG. 3.

Figure 3:
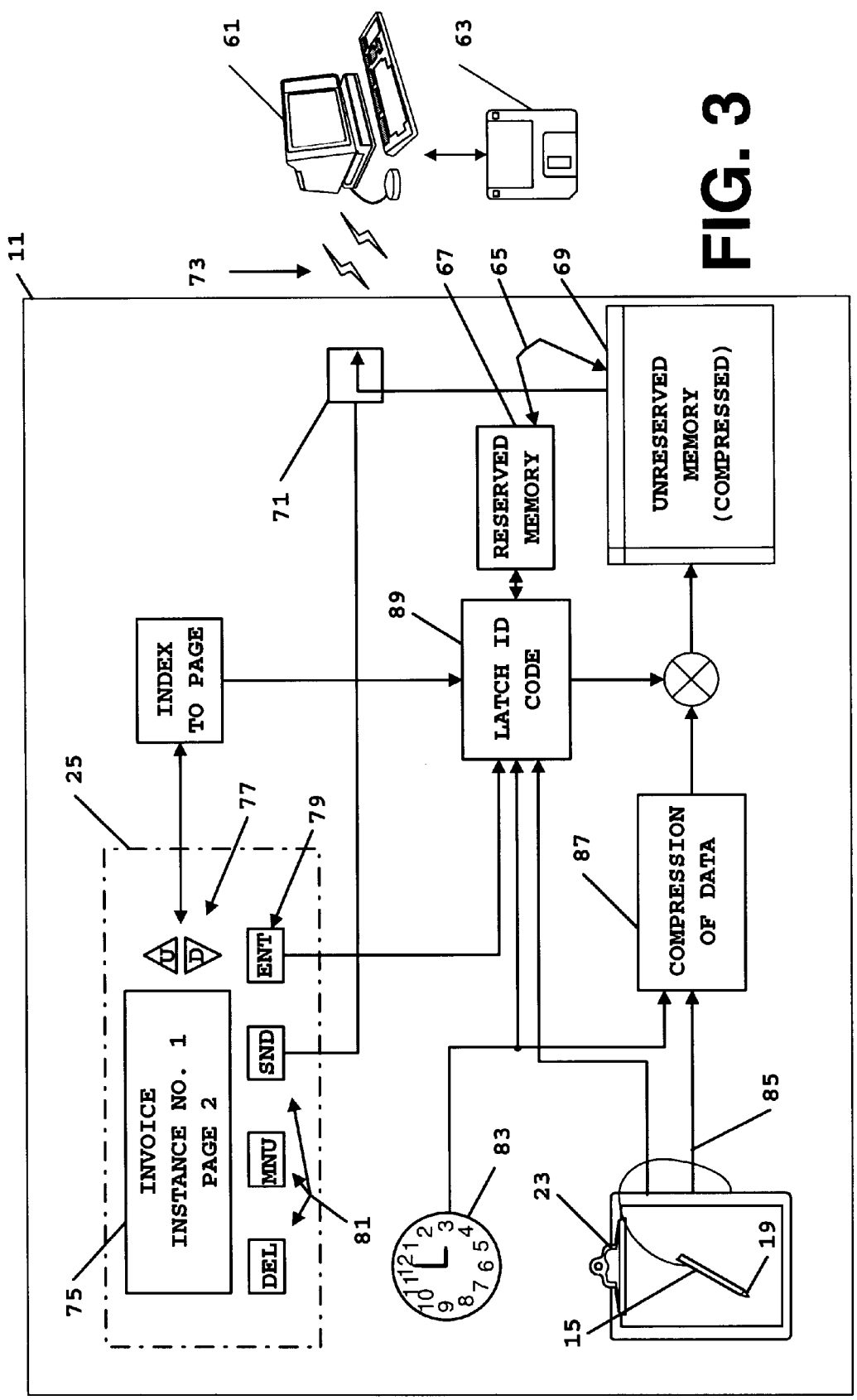
FIG. 3 is an illustrative diagram indicating data processing elements of the clipboard of FIG. 1, and how those elements cooperate to create a data stream for selective transmission to a remote editor (e.g., a remote personal computer).

The clipboard and its internal, functional components are indicated by the reference numeral 11 of FIG. 3. FIG. 3 also indicates use of remote transmission, e.g., modem, infrared communication or other serial communications, to a remote computer 61. The remote computer, preferably a personal computer running suitable imaging and interface software is used to upload, display, process and edit entered stylus data. The remote computer can also be used to prepare the data for archiving, as indicated by the presence of a computer disk 63.

FIG. 3 shows the stylus 15 and paper supporting surface 23 (which includes the digitizer), the user interface 25, several boxes indicating CPU and support chip processing functions, and memory used by the clipboard, generally designated by the reference numeral 65 and shown in two boxes 67 and 69. Memory used for data storage is preferably non-volatile "flash" memory and, preferably, the clipboard includes both internal, permanent memory (ideally at least one megabyte) with an external slot for receiving a PCMCIA card having additional memory. The first memory box 67 represents memory space reserved in random access memory ("RAM") for CPU functions, while second memory box 69 is flash memory used for sequential storage of data and selected commands ("data memory"). FIG. 3 also indicates a data transmission port 71, which preferably includes a serial communications port for communications with the remote computer (indicated by reference numeral 73); the user interface provides the user with control over both of these devices, and returns error messages if, for example, the user attempts to use the modem without a proper telephonic connection.

The preferred user interface is indicated in FIG. 3 by the reference numeral 25. A LCD 75 is used to display individual menu choices, while a set of scroll "up" and scroll "down" buttons 77 are utilized to scroll through displayable menu choices. The interface also includes an "enter" button 79 for selecting displayed menu choices, as well as a "menu" button for returning to the root menu, a "send" button for transmitting data to the remote computer, and a "delete" button for removing form instances from the memory space reserved for the CPU (the three latter buttons are collectively designated by the reference numeral 81 in FIG.3). Importantly, transmission of the single data stream of combined data and user commands to the remote computer 61 is not the only type of transmission that can occur, and the "send" button also is preferably used (via firmware for the clipboard) to place the clipboard in a state where it can receive both software commands and programming relating to definition of form types.

At the time a user creates a new form instance, the CPU assigns an index to the each page of a form, which it stores in its reserved memory space 67 in a list of active forms, and the CPU also assigns a unique code to each page (if one is not already known to the clipboard, e.g., via memory or scanned bar code). For example, a newly created form might receive an index of "1," as well as an identification code, including a type identifier (e.g., "invoice") and a unique serial code. The user, in switching between active forms, does not need to navigate the forms hierarchy, discussed earlier, but can simply scroll through the CPU's index of active forms and use the "enter" key 79 to switch between multiple pages stacked on the clipboard's surface. Data entered using the stylus 15 will be associated with the currently selected page the user has selected, and stylus position is detected even if there are a large number of underlying pages between the paper supporting surface and the form being written upon by the user.

Each time the writing tip 19 is newly depressed, the clipboard's CPU samples a real time clock 83, and inserts this data (including date and time of day) into a data stream from the clipboard and stylus. The clipboard is normally maintained in a sleep mode, and is awakened when the user places the writing tip in contact with an object, thus closing a switch in the stylus triggers an interrupt signal within the CPU. This interrupt signal causes the CPU to empower clipboard electronics and begin actively "listening" to the stylus. When "listening," the clipboard preferably samples data each ten milliseconds, although only data representing writings on the clipboard (e.g., when the tip-down switch is concurrently closed) will be passed to the data memory 69 as a stream of stylus data. At the same time that the clipboard processes stylus data, it compresses that data as appropriate, as indicated by block 87 in FIG. 3.

Each time a user selects a page (or creates a new page or form) using the user interface, the CPU uses the index of active page and forms to retrieve from reserved memory space the unique identification code corresponding to a particular page, and the CPU inserts this identification code (as indicated by reference numeral 89) into the data stream via a summing junction, as has been previously described. The aggregate data stream is then sequentially stored in data memory 69, with memory location indexed by form instance, page and time of entry also being recorded in the CPU's reserved memory.

In processing other user commands, the CPU relies upon its reserved memory space 67 in manipulating data stored in the sequential memory. As an example, if the user selects a menu choice of deleting a specific form and instance, the CPU checks its reserved memory space to locate data in the data memory 69 corresponding to that data. The CPU is not required to physically overwrite data in the data memory, but rather, it changes its reserved memory space to remove references indicating use of the data memory corresponding to the form. Similarly, the CPU processes requests to upload specific form data to the remote computer 61, e.g., by instructing the sequential memory to only transmit data found at selected memory locations in the clipboard.

III. PREFERRED DATA FORMAT

A. Stylus Data Generation

At times when the clipboard is awake, the CPU receives stylus data as an analog signal, and it processes that data to determine stylus position and whether stylus data represents "ink" or other page markings. Beneath the paper supporting surface of the clipboard, a crossing pattern of "x" and "y" driver signals, with signals separated in time and trace lines arranged in a unique configuration permit the CPU to very closely determine stylus position relative to the paper supporting surface, even when the stylus is several millimeters away from that surface. For example, the paper supporting surface can repeatedly use eight different "x" driver lines and eight different "y" driver lines in a non-repeating pattern. The writing tip 19 electronically detects these driver signals at different times and in varying relative magnitude depending upon distance between the stylus and corresponding driver signal. The stylus provides a data signal to an analog-to-digital converter, which the CPU interrogates at ten millisecond intervals; during each such interval, the CPU determines relative magnitude of each of the sixteen driver signals, and uses a look-up table to uniquely determine stylus position.

While the CPU when awake constantly "listens" to stylus data (e.g., for reentering a sleep mode following a period of inactivity), the CPU preferably otherwise ignores stylus data unless the tip-down switch within the stylus is depressed, indicating that the user is writing upon a surface. At this point, the CPU performs compression as further described below, and then loads the data into the next memory position in sequential memory as a two-to-six byte stylus position packet. The configuration of data within the stylus position packet will be further described below.

Additional details about the configuration of the preferred digitizer, and scheme for detecting stylus position, can be found in U.S. Pat. No. 4,806,918, which is hereby incorporated by reference in its entirety as though identically set forth herein.

B. Data Compression and Storage in Memory

As mentioned earlier, it is desired that the preferred clipboard be lightweight while having memory sufficient to store data corresponding to entry of a large number of forms. The clipboard's CPU thus, when processing commands and data to form a single data stream, also compresses the data for sequential storage in the memory. The memory, generally indicated by reference numeral 65 in FIG. 3, preferably includes both at least one megabyte of nonvolatile memory internal to the clipboard, and it may also include expandable memory such as a sixteen megabyte PCMCIA flash card. The clipboard's CPU reserves a space in memory 67 for indexing currently active forms and for also tracking memory contents in 32 kilobyte memory blocks. Within this reserved memory space 67, the CPU stores information representing memory allocation including indices of memory used by form type, form instance, page number, and time of data entry, for processing commands either from the clipboard (via the user interface) or the remote computer.

Apart from the reserved memory space 67, data and commands intended for later use (e.g., page change commands) are stored sequentially in the remaining available (data) memory 69 on a first-come, first-served basis. In the reserved memory 67, the clipboard CPU also stores indications of used and available memory, and displays memory status to the user, either upon request or when the memory is full.

If the clipboard 11 is coupled by serial interface to the remote computer 61, the remote computer can command uploading of data corresponding to either the entire data memory, or to a specific page or form; this command be also be effected using the menu functions of the clipboard user interface 25. Data is preferably transmitted to the remote computer in units of "pages," which are delimited by index entries in the CPU's index list. Within a page, data is transferred directly from the clipboard memory to the remote computer, via the serial output link, without interpretation occurring at the clipboard. Decompression of the data, decoding of the stylus position data, and interpretation of the interpolated context and other input data, are then subsequently carried out by the software running on the remote computer. Once data has been transferred from the clipboard, the user is preferably prompted whether to erase data which has been transmitted to the remote computer, or all data which is associated with the particular page or form instance. If erased, the reserved memory space 67 is used by the CPU to locate data and erase data corresponding to the particular page or form instance, even if stored in fragments within the clipboard's data memory.

If data memory is implemented as flash memory, memory reuse is possible if data has been deleted in contiguous memory blocks (typically 128 K bytes), either at the beginning or end of the clipboard's data memory space. Unless sufficient memory space is available either at the beginning or end of the clipboard's data memory space, the clipboard's user interface indicates that memory is full, and data must be uploaded prior to acceptance of additional data. Importantly, a defragmentation feature could optionally be implemented in clipboard firmware, to compact valid data to fill-in unused space each time data is erased, but this option has not been implemented in the preferred embodiment. Alternatively, the user can also add PCMCIA cards, and the CPU is effective to ascertain the capacity of new memory. The occurrence of particular patterns in the input data, for example, a signal from the user interface that a new form has been inserted, may cause the CPU to add a pointer into the memory to its index, so that this particular event may be readily retrieved. Once the data has been written to the memory, it is preferably not subsequently altered or reordered.

Within this framework, the preferred compression scheme is explained with reference to FIGS. 4–8. This compression scheme utilizes data packets having {x,y,t} coordinates and representing either a code or sequential position of the stylus on the surface of the digitizing pad. In other, alternative embodiments, for example, an embodiment which include a built-in microphone, the data packets can also represent audio data, with the "t" coordinates indicating data "type" to be audio. In the uncompressed state, each packet consists of six bytes, while in the fully compressed state, a packet can have as few as two bytes.

In the case of stylus data, the uncompressed data packets include three two-byte words for the "x" coordinate, the "y" coordinate and stylus pressure and packet type information ("t" data). Normally, stylus pressure will be indicated via one or two bits indicating whether the writing tip of the stylus is in contact with a surface, and the two bytes otherwise carry identification information as to whether the packet represents either clipboard codes, stylus "type" data, or other non-stylus data.

If the "t" data bytes indicate that the packet represents date or time, the four "x" and "y" bytes are interpreted as the year, month and day or as minutes and tenths of seconds after midnight, respectively. Form identification is performed using the four "x" and "y" bytes to represent raw ASCII data, e.g., from a bar code scanner or an form identifier from the CPU's reserved memory space, and by encoding page number as a separate data packet.

The {x,y,t} data format is also used to communicate codes not stored as part of the sequential data stream in the clipboard's memory, generally for communication with the remote computer. The clipboard can encode form index relative to the clipboard (e.g., one of one-hundred and thirty two possible active forms, using the four "x" and "y" bytes to encode time with the last seven bits of the "t" bytes carrying an index number). The clipboard can also report its memory status to the remote computer using the "x" and "y" data words to indicate the number of utilized (32K) blocks, and the number of bytes in excess of a multiple of 32K, respectively.

Many other code schemes are available for encoding particular types of non-stylus data, and selection of a suitable coding scheme is left to one familiar with digital communication schemes.

Figure 4:
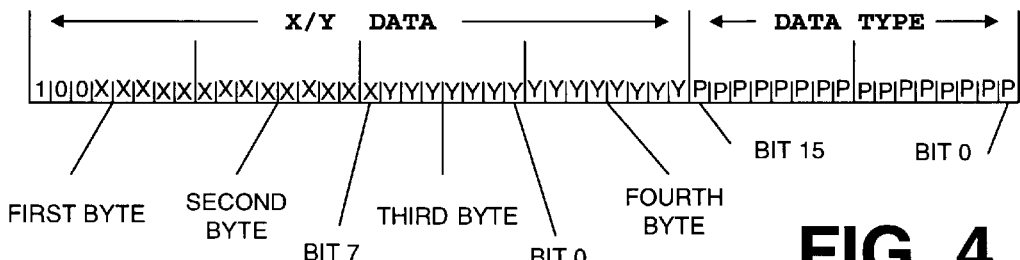
Figure 5:
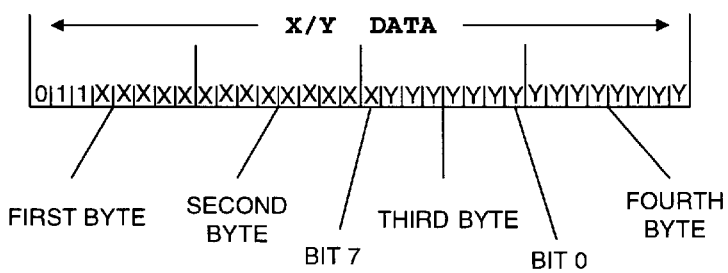
Figure 6:
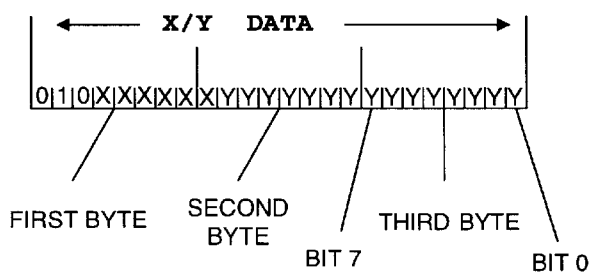
Figure 7:
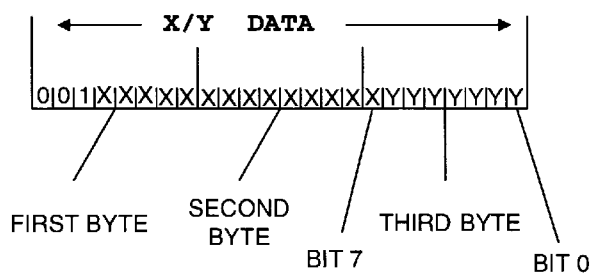

Preferably, stylus data is compressed to as little as two bytes for minimizing memory use and modem transmission requirements, using a delta compression scheme. In the preferred scheme, indicated with reference to FIGS. 4–8, the highest-order bit of the first byte is the "delta-t" flag, the second highest-order bit of the first byte is the "delta-x" flag, and the third highest-order bit of the first byte is the "delta-y" flag. Uncompressed data thus includes two bytes each of "x" and "y" position values, and two bytes of packet type (or "t") data, as seen in FIG. 4. When the "delta-t" bit is set (to binary 1), the value of the two "t" bytes differs from that of the previous point, hence these two bytes are included in the data packet. If the "delta-t" bit is reset (binary 0), the two "t" bytes are omitted from the data packet, as indicated by FIG. 5. If the "delta-x" bit is set, the "x" position is within ±31 units of the preceding "x" position and is encoded as a signed six-bit delta from the previous "x" position. In this instance, the second "x" byte is omitted, as indicated by FIG. 6, and the second data byte is then the first byte of "y" information. The "x" sign bit is most significant bit of this first "y" byte, and the magnitude of horizontal position change is represented in the last five bits of the first data byte. If the "delta-x" bit is reset (binary zero), then the "x" position is outside the delta range and absolute horizontal position is encoded as an unsigned 14-bit value using the first bit of the third byte and the low 13 bits of the first two bytes.

If the "delta-y" bit is set, then the "y" position is within ±63 units of the preceding "y" position and is encoded as a signed seven-bit delta from the previous "x" position. In this case, the second "y" byte is omitted, and the "delta-y" value is encoded in the low seven bits of the second data byte, as indicated in FIG. 8. If the "delta-y" bit is reset (binary zero), then the "y" position is outside the delta range and is encoded as an unsigned fifteen-bit value representing absolute position, in the low fifteen bits of the second group of "y" data bytes (e.g., either the second and third bytes, if "x" data is compressed, per FIG. 6, or the third and fourth bytes otherwise, per FIGS. 4–5).

With this scheme, the large majority of stylus data points require only two bytes to represent in memory. The actual number of bytes used to represent a compressed data point can be determined from the three "delta" flags in the first byte. The scheme can very effectively be used to report "x" position across the paper supporting surface with a resolution of one in 16,384 units, and "y" position with a resolution of one in 32,768 units.

C. Transfer of Data

Data is stored in sequential data blocks, with the CPU using its reserve memory space to store flags identifying forms and page changes and the like; in such a manner, either the clipboard or the remote computer (when in communication with the clipboard) may instruct upload of (a) memory contents, including page and form codes, or (b) data for specific pages or forms, either using the CPU's index or a unique code for the page or form (e.g., a bar code).

To upload data using the user interface, the user of the clipboard places the clipboard in communication with the remote editor which, as mentioned earlier, can be a personal computer running suitable software. Preferably, the clipboard includes several alternative mechanisms for communication, including a a serial connection interface (e.g., an RS-232 coupling). When turned "on," the clipboard can act in either a master or slave mode for sending communications to the remote computer, either permitting the user of the clipboard to select either a page index (e.g., page 1–132) or a page identification code, including form instance; the user selects appropriate menu options displayed via the LCD of the user interface, and then pushes the "send" button to trigger upload to the remote computer. Preferably, an acknowledgment from the remote computer is required before upload can begin and, following upload, data is automatically erased which has been successfully uploaded to the remote computer. The user interface and associated menu preferably also include means for dialing a phone number and controlling the modem to establish and maintain communication with the remote computer.

The remote computer, once in receipt of an uploaded file, saves the file as a distinct record on hard disk. This record can then be used to (a) print entered stylus data, e.g., using a printer to print directly upon a blank page or blank preprinted form, (b) edit the entered data, for example, using the "splicing" utility mentioned below, (c) combine the entered data with image data, such that the form can be recreated entirely from electronic memory and then printed upon blank paper or saved, or (d) suitably archive the entered stylus data, with an index to the type of form which was originally used (e.g., "invoice, 1995 version"); whether or not a code identifying page instance specifically identifies form type, the remote computer can add such information for proper archiving.

IV. "SPLICING" USING THE REMOTE COMPUTER

As indicated above, software on the remote computer segregates entered data according to identified pages, such that image "windows" are created for each page of data. In addition, the software preferably provides utilities for communications with the clipboard for purposes of checking the clipboard's memory status, battery power, index of forms (either current active forms or specific "type" and "instance" codes), for determining contents of the clipboard's memory, and for uploading either all memory or data corresponding to a specific form.

The remote computer also preferably includes "splicing" software which permits a time playback of a segment of entered data upon a computer monitor, such that a user can advance forward and backward in time and "watch" a time window of entered stylus data being visually added to displayed images. With the ability to focus on a segment of time during which data was entered, the "splicing" feature enables a user to separate spatially overlapping data based upon relative time of entry, and permits that data to be reassigned to different pages of data, or data from different pages of data to be combined into a single page. The "splicing" feature is further described with reference to FIGS. 9–17.

FIGS. 9–10 each show hypothetical writings entered using the clipboard 11 of FIG. 1, where it is presumed that a page change was not electronically marked in the aggregate data stream. Illustrated via FIGS. 9–10, the user has first entered a money amount ($69.95) 101 upon a top page 14 (FIG. 9), then switched to a bottom page 20 (FIG. 10) to enter the text "Have a nice day" 103, and lastly, switched back to the top page (FIG. 9) to enter two initials ("tj") 105. In this example, a single data stream was created having stylus data representing (in order) (a) ten millisecond samplings of the drawing of the money amount (including time and date codes), (b) ten millisecond samplings of pen strokes corresponding to the text "Have a nice day" (including time and date codes) and (c) ten millisecond samplings of entry of two initials (including time and date codes). When processed by software on the remote computer, a resulting image 107 has the appearance indicated in FIG. 11, and it is desired to sort entered data into two image pages (as the data was physically entered on different pages) and correct spatial overlap of the entered data.

In this regard, if proper electronic page markings had been entered at a significant location within the sequential data, the sequential data would have included the following (as well as appropriate time and date codes): (a) a command identifying the top page; (b) ten millisecond samplings of the drawing of the money amount ($69.95); (c) a command identifying that the user now wishes to write upon the second page; (d) ten millisecond samplings of pen strokes corresponding to the text "Have a nice day," (e) a command identifying that the user now wishes to write upon the top page; and (f) ten millisecond samplings of entry of two initials ("tj"). The "splicing" feature of the software is relied upon to properly sort the data, in the absence of properly entered page identification codes.

FIGS. 12–17 are used to explain the operation of the "splicing" feature used by a remote computer in the previous example, to separate the spatially overlapping data and form two separate pages from that data. The operator of the remote computer first uploads the entered stylus data from the clipboard (reported as corresponding to a single form) and selects an appropriate time range and the "splicing" feature.

Figure 12:
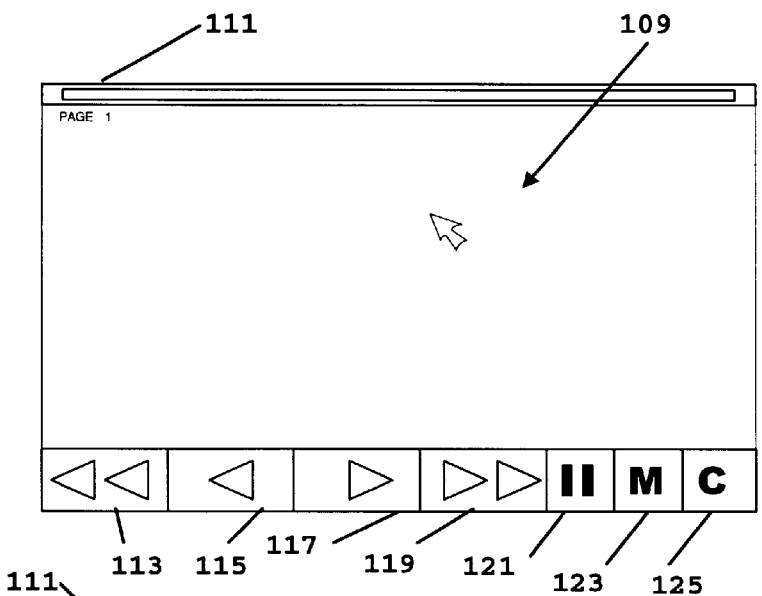

As seen in FIG. 12, the "splicing" feature causes the software to display a graphics window 109 for recreating and displaying the act of entering data upon the multiple forms, from an electronic viewpoint. A status bar 111 at the top of the FIG. 12 indicates that time is "early" in the writing process represented by FIGS. 9 and 10, e.g., corresponding to a time prior to any writings on either the top or bottom pages. FIG. 12 also indicates the presence of "fast rewind," "play backward," "play forward," "fast forward," "pause," "mark" and "cut" buttons 113, 115, 117, 119, 121, 123 and 125, which are displayed at the bottom of the screen. An operator of the editing software utilizes a mouse or other interface to control the buttons to move time forward or backward from with respect to data entry upon the clipboard, much in the same manner as playing a video tape. If time is moved backward, images already displayed upon the screen will be erased in the reverse order in which those images were entered, sampled-point by sampled-point. If time is played forward, additional images will be added in the order and time in which they were entered upon the clipboard.

Figure 13:
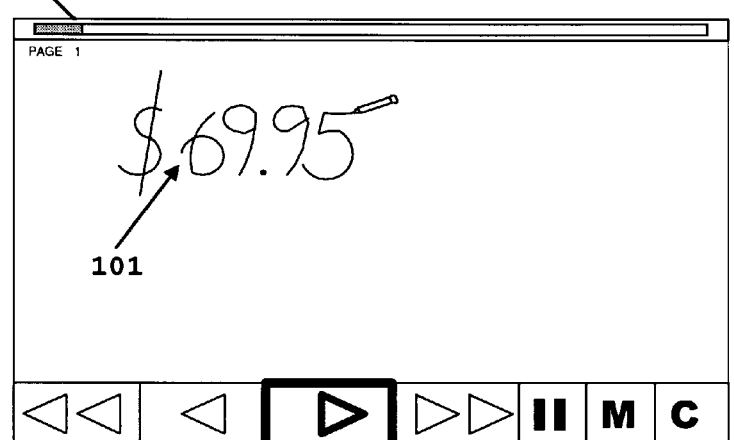
Figure 14:
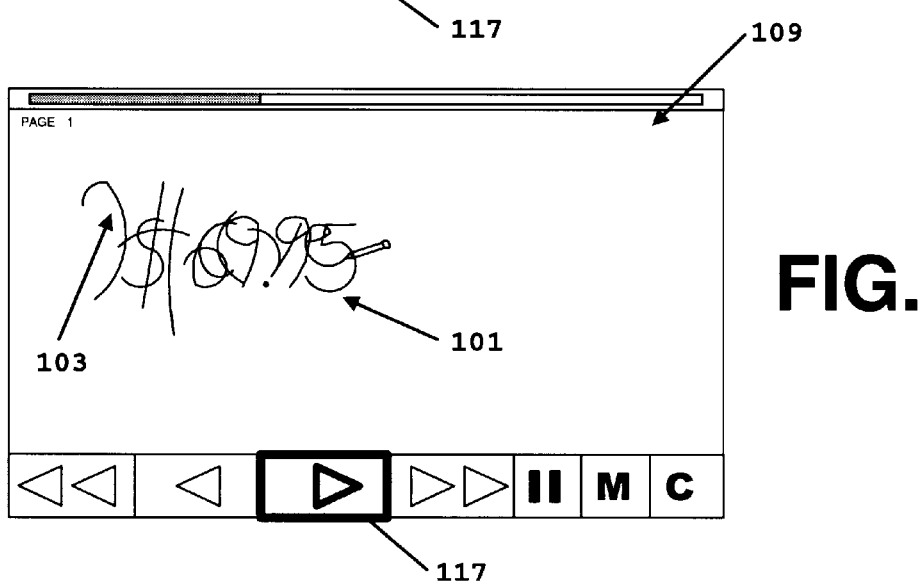
Figure 15:
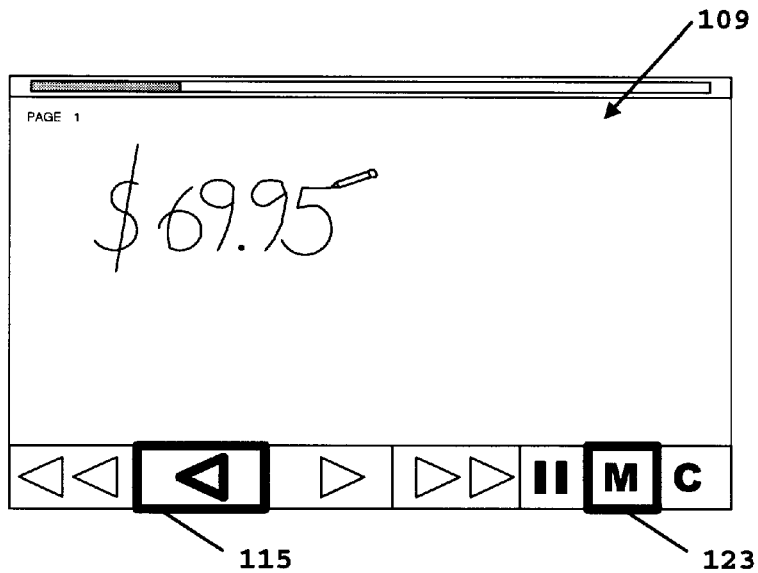
Figure 16:

FIG. 13 is a representation similar to FIG. 12, but in which the "play button" 117 has been pressed and some time has passed, as indicated by the status bar 111 at the top of FIG. 13; the sequence of data entered using the clipboard has been "played forward" to correspond to the time just after entry of the written amount 101 ($69.95, seen also in FIG. 9). It is at this point that the user of the clipboard switched to writing upon the bottom page, but since no page identification appears in the data stream, the editing program as additional time passes will erroneously superimpose additional data (e.g., the text "Have a nice day") upon the amount. Thus, FIG. 14 represents the remote computer's graphics window 109 where additional time has passed, corresponding to the writing of both of the amount ($69.95) 101 upon the top form and a part of the text "Have a nice day" 103 upon the bottom form.

The operator of the remote computer then selects the "mark" button 123 and the "play backward" button 115 of the graphics window 109, to thereby move backward in time while marking for edit the erroneous data, e.g., the superimposed text "Have a nice day." Since each datum from the input device (e.g., the stylus) is associated with a specific time, and each sample from the input device is kept in order in a sequence, overlapping visual data may be distinguished notwithstanding any spatial overlap of that data. Once the operator of the computer has moved sufficiently backward in time, the operator stops the playback and selects a "cut" button 125 (FIG. 16), which preferably causes the opening of a new, "cut" window 127 for a separate image (i.e., the cut writings "Have a nice day")

Figure 17:
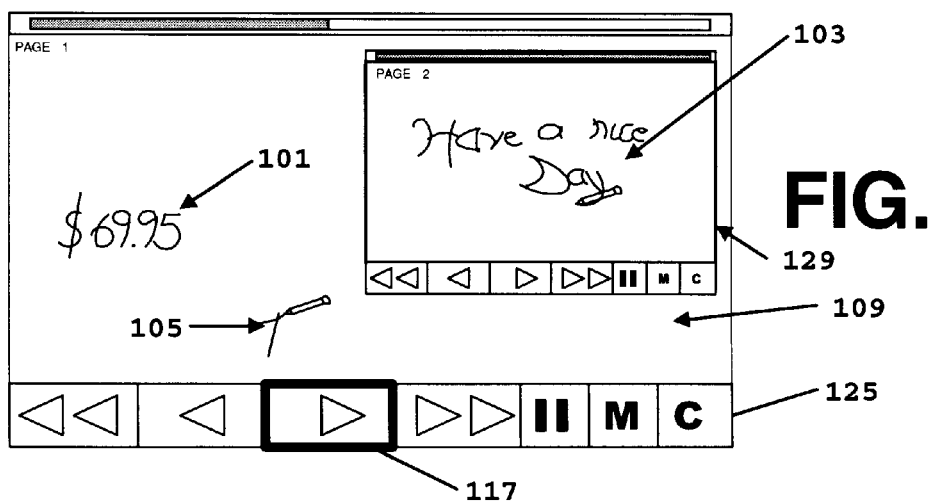

As seen in FIG. 17, the operator can create a new image window 129, into which the cut writings are copied, and then again select the original "play button" 117 to again move time forward and display additional writings as they were originally entered (FIG. 17). The operator at this point is left with two separate images, one corresponding to entry of data upon the top page (FIG. 9) and one corresponding to entry of data upon the bottom page (FIG. 10). The contents of the second window 129 can then be mapped to the proper page with spatial locality being selected by the operator.

Various alternative embodiments of the present invention will occur to those having skill in electronics or software. For example, another input device for creating spatially variant data may be used instead of a stylus and digitizing clipboard, such as a mouse or other implement. Software alternatives will also occur to those having programming skill, which effect splicing of input-data based upon time, to sort that data between different image windows or other applications; all of these modifications are viewed as within the spirit of the present invention.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A data recording apparatus adapted for creating plural pages or forms of data in a format adapted for editing by a remote editor, comprising:

an input device selectively operated by a user to enter a first sequence of data representing spatial coordinates;

a command mechanism selectively used to command a first change from a first one of the plural pages or forms of data to a second one of the plural pages or forms of data and adapted to command a second change, back to the first one of the pages or forms; and one of software, firmware and hardware that inserts command codes representing the changes at locations within the first sequence of data dependent upon the relative timing between commands of change by the user and individual ones of the data, such that a second sequence of data is produced which includes both data representing spatial coordinates and at least two inserted commands;

wherein the inserted commands are adapted to permit the remote editor to subsequently distinguish, based on the second sequence, data intended by the user for different ones of the plural pages or forms, notwithstanding any possible spatial overlap of represented by the data, based upon relative timing of inserted commands relative to data of the first sequence.

2. An apparatus according to claim 1, wherein:

the command mechanism includes a user interface having a visual display, for displaying possible commands, and an enter button, for selecting one of the possible commands.

3. An apparatus according to claim 1, wherein:

the command mechanism includes a bar code scanning mechanism, adapted to scan a bar code on the second one of the multiple pages or forms which uniquely identifies the second one of the multiple pages or forms.

4. An apparatus according to claim 1, wherein:

the input device includes a digitizer which mounts the plural pages or forms, and a stylus utilized by the user to write data physically onto the plural pages or forms, the first sequence of data being produced at regular periodic intervals and representing relative position of the stylus with respect to the digitizer;

the first and second sequences of data include data electronically representing stylus strokes; and the inserted commands are adapted to permit the remote editor to electronically associate individual stylus strokes with individual ones of the multiple pages or forms, notwithstanding spatial overlap between multiple stylus strokes with each other with respect to the digitizer.

5. An apparatus according to claim 1, further comprising a time code generator, wherein at least one of the first and second sequences is formatted to include a time code associated with the data from the input device, such that the remote editor may separate data into at least two groups based upon time of data entry and notwithstanding any spatial overlap represented by the data.

6. An apparatus according to claim 1, wherein:

the first sequence includes data representing spatial coordinates sampled at regular and periodic intervals; and said apparatus further includes a buffer for temporarily storing one of the command codes and the data representing spatial coordinates, and a mechanism for inserting the command codes in between the data representing spatial coordinates.

7. An apparatus according to claim 6, wherein the data representing spatial coordinates represents a sampling at least ten times per second.

8. An apparatus according to claim 1, further comprising a wireless communications device that transmits data from said apparatus to the remote editor.

9. An apparatus according to claim 1, further comprising digital memory which is internal to said apparatus, the second sequence of data being stored in the memory in a manner adapted for selective later transmission to the remote editor.

10. An apparatus according to claim 1, wherein said apparatus is a portable electronic board and further comprises internal memory that stores the data representing spatial coordinates without a concurrent electronic display of such data.

11. An apparatus according to claim 10, wherein:

said apparatus further includes a paper-supporting surface that receives the plural pages or forms, and an stylus;

the stylus includes an inking mechanism for writing on the plural pages or forms, the digitizer being associated with the paper-supporting surface for digitizing stylus stroke information for storage in the memory; and entry of data by the user using the inking mechanism both inks a hard-copy of a page or form and also results in digitization of all stylus entered by the user on the page or form, without regard to any pre-printed fields or matter appearing on the page or form.

12. An apparatus according to claim 1, wherein the command mechanism includes a mechanism that inserts a page identification code in response to a change between different ones of plural pages, the page identification code being uniquely associated with one of the plural pages.

13. An apparatus according to claim 1, further comprising software that compresses data from the first sequence of data for inclusion into the second sequence of data.

14. An improvement according to claim 13, wherein the software further compresses position data to a variable length format and to include flags indicating length of compressed position data, for inclusion into the second sequence of data.

15. In a portable electronic board mounting plural pages in a stacked, overlapping relationship, the board including an input device adapted to permit a user to write upon individual pages to thereby create completed hardcopy pages, the board adapted to simultaneously digitize information entered upon the pages by the user to therefrom create an electronic file of all information entered by the user upon the pages as a single data stream, the board having a command mechanism adapted for use in identifying which one of the plural pages is being written upon, the improvement comprising:

one of software, firmware and hardware that generates command codes representing identification of page changes;

a mechanism for merging both the command codes and the single data stream in a manner that preserves their relative timing of entry, and for thereby creating a second data stream; and means for storing the second data stream internally to said board and for selectively transmitting the second data stream to a remote editor;

wherein the inserted commands are adapted to permit a remote editor to subsequently distinguish based on the second data stream digitized information intended by the user for different ones of the plural pages, notwithstanding any possible spatial overlap of represented by the data, based upon relative timing of inserted command codes relative to the digitized information.

16. An improvement according to claim 15, wherein the digitized information includes data representing spatial coordinates, the improvement further comprising a time code generator which inserts a time code as part of each datum representing spatial coordinates.

17. An improvement according to claim 15, further comprising a time code generator which inserts a time code as part of the command codes.

18. An improvement according to claim 15, further comprising:

using a stylus as the input device;

forming the single data stream to represent samples of continuous stylus strokes; and producing and inserting into at least the second data stream an indication that data represents a new stylus stroke.

19. An improvement according to claim 18, further comprising:

a time code generator which inserts a time code as part of the command codes; and including in the indication a time code which identifies a time associated with the corresponding stylus stroke.

20. An improvement according to claim 19, the improvement further comprising forming the indication in response to a change in pen pressure, and inserting into at least the second data stream a time code corresponding to the change in pen pressure.

21. An improvement according to claim 15, further comprising compressing data from the single data stream.

22. An improvement according to claim 21, wherein compressing data includes compressing position data to a variable length format and to include flags indicating length of compressed position data.

* * * * *